(12) United States Patent
Oda

(10) Patent No.: US 7,714,259 B2
(45) Date of Patent: May 11, 2010

(54) VIDEO PROJECTOR HAVING A POWER TRANSMISSION MECHANISM BETWEEN A DRIVE WHEEL AND A ZOOM RING

(75) Inventor: Akihiro Oda, Daito (JP)

(73) Assignee: Funal Electric Co., Ltd., Daito-shi (JP)

( * ) Notice: Subject to any disclaimer, the term of this patent is extended or adjusted under 35 U.S.C. 154(b) by 554 days.

(21) Appl. No.: 11/753,316

(22) Filed: May 24, 2007

(65) Prior Publication Data

US 2007/0273846 A1 Nov. 29, 2007

(30) Foreign Application Priority Data

May 24, 2006 (JP) ............................. 2006-144415

(51) Int. Cl.
*G02B 7/04* (2006.01)
(52) U.S. Cl. .................................. 250/201.2; 250/239
(58) Field of Classification Search .............. 250/201.2, 250/201.4, 201.7, 208.1, 239; 353/72, 74, 353/76, 101; 359/819, 704, 686, 618, 688, 359/683

See application file for complete search history.

(56) References Cited

U.S. PATENT DOCUMENTS 4,907,873 A * 3/1990 Kuriyama .................. 353/101
2007/0052935 A1 3/2007 Nakamura

FOREIGN PATENT DOCUMENTS

| JP | 8-76246 A | 3/1996 |
|---|---|---|
| JP | 2001-183739 A | 7/2001 |
| JP | 2002-277957 A | 9/2002 |
| JP | 2004-29356 A | 1/2004 |
| JP | 2005-333460 A | 12/2005 |

* cited by examiner

*Primary Examiner*—Que T Le
(74) *Attorney, Agent, or Firm*—Crowell & Moring LLP

(57) ABSTRACT

A video projector (1) comprises a projection lens (18) which projects an image on a screen (S), a zoom ring (19) which varies a magnification ratio of the projection lens (18), a drive wheel (32) which is partially protruded from a bottom face of a housing (2), and a plurality of gears (310, 311, 312) that constitutes a power transmission mechanism (31) between the drive wheel (32) and the zoom ring (19). When the video projector (1) is moved in an anteroposterior direction to the screen with rotating the drive wheel (32), the zoom ring (19) is turned in conjunction with the rotation of the drive wheel (32) through the power transmission mechanism (31). Since the magnification ratio of the projection lens (18) is varied with the turning of the zoom ring (19), the size of the image projected on the screen is varied without a direct operation of the zoom ring (19) by a user.

6 Claims, 4 Drawing Sheets

VIDEO PROJECTOR HAVING A POWER TRANSMISSION MECHANISM BETWEEN A DRIVE WHEEL AND A ZOOM RING

BACKGROUND OF THE INVENTION

1. Field of the Invention

The present invention relates to a video projector which projects images on an external screen.

2. Description of the Related Art

Conventionally, a video projector, which projects images on an external screen on the basis of image signals outputted from a personal computer, for example, has a function to vary a magnification ratio to enlarge images depending on a size of a screen or a distance from the video projector to the screen. As for a relatively inexpensive video projector, for example, a user can change the magnification ratio to enlarge images by turning a zoom ring located around a projection lens which projects images.

In the relatively inexpensive video projector described above, the user should operate the zoom ring around the projection lens to vary the size of the images projected on the screen even when the video projector is in use. In operating the zoom ring, the user often blocks the image projected on the screen in front of the projection lens unintentionally, and thus, it is so inconvenient as to make the other user who watches the image feel discomfort. Such a problem can be solved by using a video projector in which an image zooming can remotely be operated, for example. It, however, is too expensive to apply such a configuration to the inexpensive video projector with simple configuration.

A conventional video projector described in, for example, Japanese Laid-Open Patent Publication No. 2005-333460 comprises movable wheels which are driven by a motor so as to adjust a location of a projected image by controlling and changing a location and an attitude of a projector body. However, the conventional video projector described in 2005-333460 has a complex configuration to drive the movable wheels, and thereby, it causes expensiveness. Thus, such a configuration of movable wheels cannot be applied to the relatively inexpensive video projector, and the above problem cannot be solved.

Another conventional video projector described in, for example, Japanese Laid-Open Patent Publication No. 2004-29356 is configured to vary a size of an image projected on a screen by moving a projector body forward and backward. However, during use of the video projector, an installation location can often be changed little, and in such a situation, the image cannot be adjusted to be an intended size without varying a magnification ratio of the projection lens. Moreover, depending on a purpose of use of the video projector, the size of the image projected on the screen is not often wished to be changed when the installation location of the video projector is changed. In this case, as for the conventional video projector described in 2004-29356, the user should operate the zoom ring, so that the above problem is not still be solved.

SUMMARY OF THE INVENTION

The present invention is perceived to solve the problem described above, and an object of the present invention is to provide an inexpensive and more convenient video projector which enables a user to vary a size of an image projected on a screen without operating directly a portion adjacent to a projection lens.

A video projector in accordance with an aspect of the present invention comprises a light source, an image forming unit that generates an image with using image data, a projection lens to project the image formed by the image forming unit to a screen disposed in front of the video projector, and a zoom ring which varies a magnification ratio of the projection lens, a drive wheel which is partially protruded from a bottom face of a housing, and a power transmission mechanism provided between the drive wheel and the zoom ring, so that the zoom ring is turned in conjunction with the rotation of the drive wheel when the housing of the video projector is moved forward or backward in an anteroposterior direction.

According to such a configuration, when the video projector is moved in an anteroposterior direction to the screen with rotating the drive wheel, the zoom ring is turned in conjunction with the rotation of the drive wheel through the power transmission mechanism. Since the magnification ratio of the projection lens is varied with the turning of the zoom ring, the size of the image projected on the screen is varied without a direct operation of the zoom ring by a user. Consequently, an inexpensive and more convenient video projector, which enables a user to vary a size of an image projected on a screen without operating directly a portion adjacent to a projection lens, can be realized.

While the novel features of the present invention are set forth in the appended claims, the present invention will be better understood from the following detailed description taken in conjunction with the drawings.

BRIEF DESCRIPTION OF THE DRAWINGS

The present invention will be described below with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Figure 1:
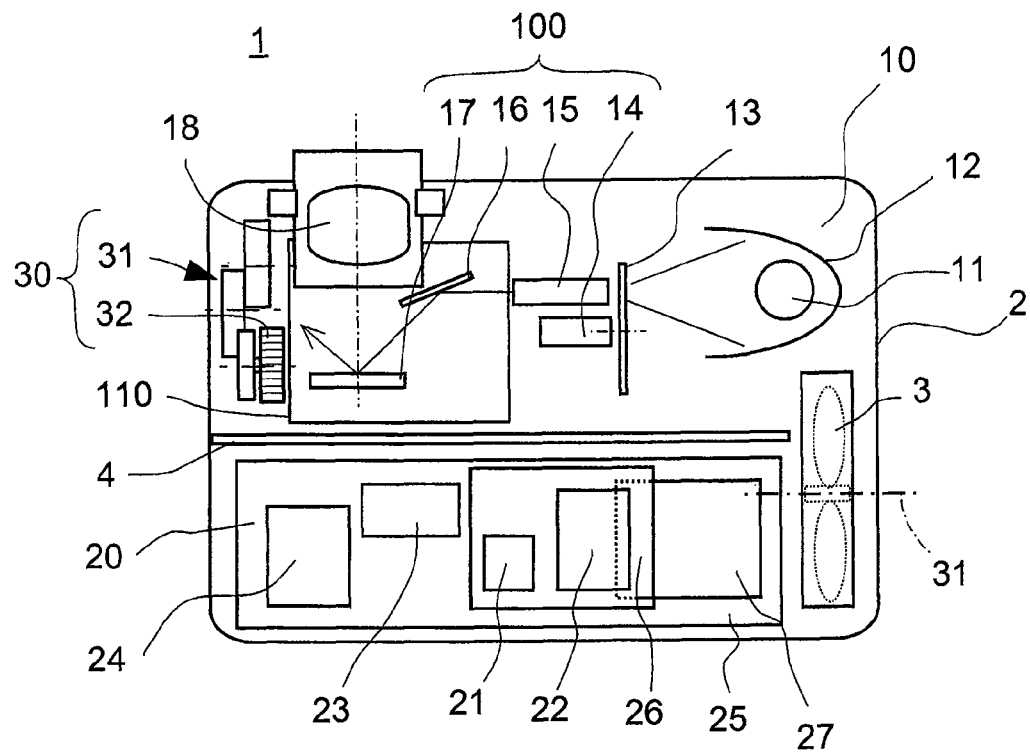
FIG. 1 is a plain sectional view showing a configuration of a video projector in accordance with a preferred embodiment of the present invention.
Figure 2A:
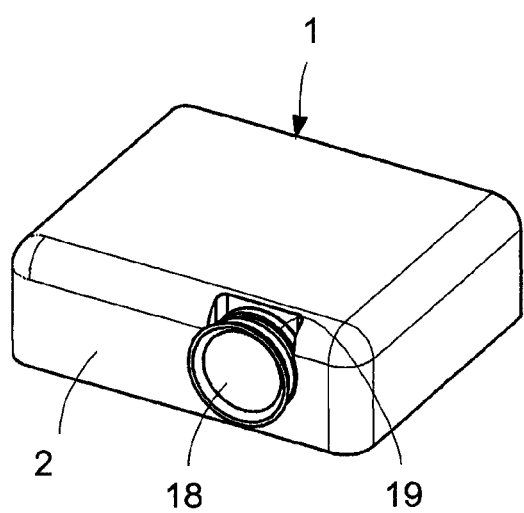
FIG. 2A is a perspective view showing a front side of the video projector.
Figure 2B:
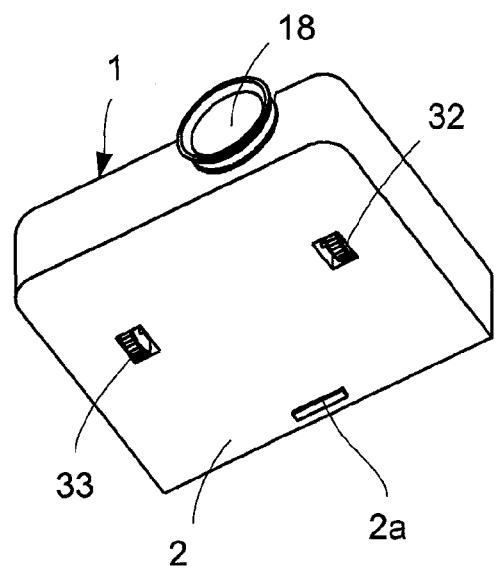
FIG. 2B is a perspective view showing a bottom side of the video projector.
Figure 3:
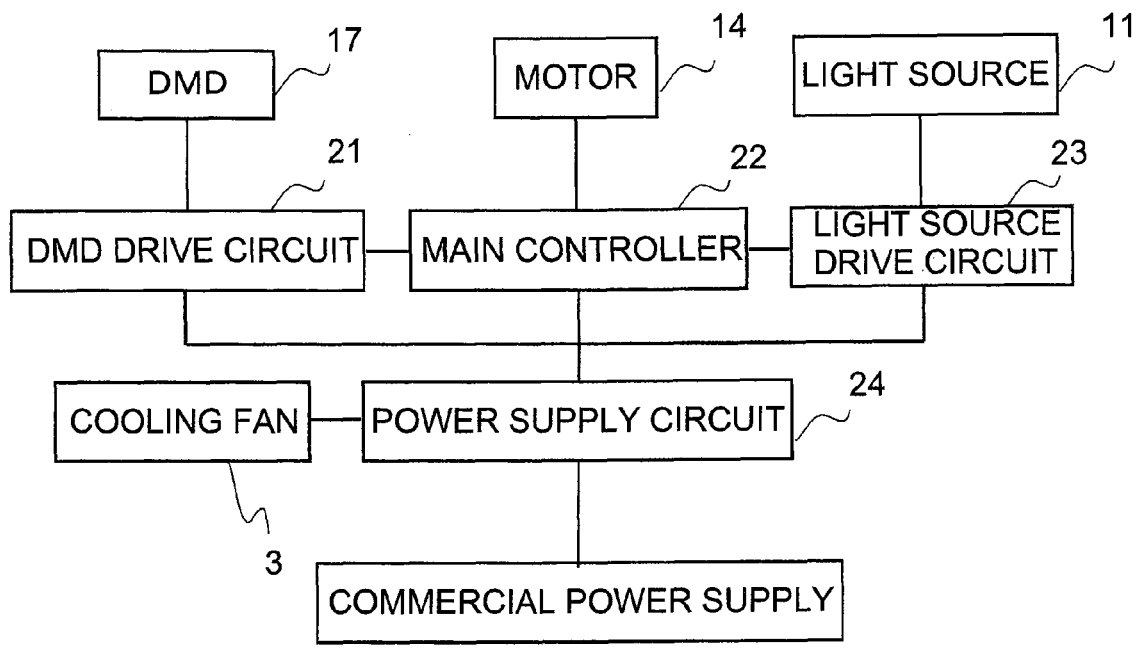
FIG. 3 is a block diagram showing a circuit configuration of the video projector.

A preferred embodiment of a video projector in accordance with the present invention is described below with reference to the drawings. FIG. 1 and FIGS. 2A and 2B show a video projector 1 in accordance with the present invention. FIG. 3 shows a circuit configuration of the video projector 1.

The video projector 1 is used to project an enlarged image on a screen which is located in front of the video projector 1 by using image signals (image data) outputted from a personal computer, a video camera, or the like.

As shown in FIG. 1, the video projector 1 comprises an optical engine 10 that is located on a front side of a housing 2, forms an image by using image signals inputted from outside, and enlarges and projects the image on a screen located in front of the video projector 1, a controller 20 that is located on a rear side of the housing 2, processes the image signals inputted from outside, and controls the optical engine 10, and a drive mechanism 30 that is located adjacent to the optical engine 10 and adjusts the image projected through the optical engine 10 according to a movement of the video projector 1, details of which will be described later.

The optical engine 10 includes a light source 11 such as a discharge lamp, for example, a reflector (light collecting member) 12, a color wheel 13, a motor 14, a mirror 16, a DMD (Digital Micromirror Device) 17, a projection lens 18, and so on. The reflector 12 reflects a light, which is outputted backward among lights outputted from the light source 11, to a forward direction, and gathers the lights in a predetermined area. The color wheel 13 is located on a light path of the light outputted from the light source 11, and has color filters corresponding to three primary colors at a certain angular pitch, and is rotated at a constant speed. The motor 14 rotates the color wheel 13 at a constant speed. The optical tunnel 15 of a certain inside diameter faces with the light source across the color wheel 13. The mirror 16 reflects a light flux, which passes through the optical tunnel 15, in a certain direction. The DMD (Digital Micromirror Device) 17 is located in a light path of the light flux passing through the color wheel 13 and then followed by the optical tunnel 15 and the mirror 16. The DMD 17 is a cluster of micromirrors arranged in two-dimensional pattern, and changes an angle of the micromirrors according to the image signals inputted from outside, and then reflects the light flux, which passes through the color wheel 13, in a certain direction (a first direction) and a second direction excluding the certain direction. The projection lens 18 projects the light flux reflected by the DMD 17 on a screen. The projection lens 18 is a zoom lens that is configured by a plurality of lens elements locations of which are changeable. The zoom ring 19, which is engaged with a zoom adjustment mechanism of the projection lens 18, is protruded outside the housing 2. According to the turn of the zoom ring 19, the lens position adjustment mechanism of the projection lens 18 is driven to change the alignment of the lens elements of the projection lens 18. Therefore, the focal length of the projection lens 18, in other words, a magnification ratio of the projection lens 18 is varied. In the present preferred embodiment, the color wheel 13, the optical tunnel 15, the mirror 16, and the DMD 17 function as an image processor 100 which outputs the light flux projected on the screen. In addition, the projection lens 18 includes a focusing mechanism that varies at least one position of a lens element constituting the projection lens 18 so as to focus the image on the screen clearly. The focusing mechanism is independently moved from the zoom adjustment mechanism. The focusing mechanism may be controlled automatically with using a known automatic focusing technology, or manually controlled by a user.

The reflector 12 has a spheroidal shape, for example, and the light source 11 is located adjacent to one focal point of the spheroid, and the color wheel 13 is partially adjacent to the other focus of the spheroid. In FIG. 1, a light source unit is separately formed in a right side of the color wheel 13, and an inner surface of the light source unit is mirrored, for example, so that more light can be gathered in the color wheel 13. In contrast, in a left side of the optical tunnel 15, a dark box unit 110 is formed to reduce an impact of a stray light, and an antireflection coating is applied to an inner surface of the dark box unit 110 to absorb a reflected light. In FIG. 1, a partition plate 4 is illustrated to divide a side of the optical engine 10 from a side of the controller 20 in the housing 2. The partition plate 4, however, is not necessary when the video projector 1 is actually manufactured. The partition plate 4 can be substituted for walls of a housing of the light source unit and the dark box unit described above.

The controller 20 includes a DMD drive circuit (control circuit) 21 which drives the DMD 17 by using the image signals, a main controller (control circuit) 22 which wholly controls the video projector 1, a light source drive circuit (control circuit) 23 which drives the light source 11, a power supply circuit 24 which provides electrical power to various units of the video projector 1 including the DMD drive circuit 21, the main controller 22, and the light source drive circuit 23, and a cooling fan 3 which generates a cooling air to cool at least the light source 11 and the power supply circuit 24.

The DMD drive circuit 21 and the main controller 22 consist of a CPU, a ROM, a RAM, and so on, for example. In addition, a noise removal filter or the like is also mounted, if necessary. The light source drive circuit 23 is an inverter circuit which controls the light source 11 such as a discharge lamp to keep the constant electrical power, and consists of a coil, a diode, a FET, and so on. Since the discharge lamp has a low temperature and a low voltage immediately after turned on, a large current may flow in the lamp if the electrical power is controlled to be constant, and thus a lamp life decreases. In order to avoid this trouble, the light source drive circuit 23 performs a warm-up to limit the current flowing in the lamp for a certain period of time after the lamp is turned on. The power supply circuit 24 is a circuit to generate a DC voltage power supply of 12V or 24V, for example, by using an alternate commercial power supply of 100V or 200V, for example, as an input, and consists of a coil, a diode, a FET, and so on.

As shown in FIG. 1, the cooling fan 3 takes an air into an inside of the housing 2 from outside and exhausts hot air caused by an absorption of heat generated in heat sources such as the light source 11, the light source drive circuit 23, the power supply circuit 24, and so on, to the outside of the housing 2. In the configuration shown in FIG. 1, the cooling air generated with the cooling fan 3 is partially led into the side of the optical engine 10 and the rest of the cooling air is led into the side of the controller 20.

The drive mechanism 30 is comprised of a power transmission mechanism 31 including a plurality of gears which is provided on the proximity of the projection lens 18 and rotatably pivoted on the housing 2 (see FIG. 4), a drive wheel 32 which is partially protruded from a bottom surface of the housing 2 and is rotatable so as to move in an anteroposterior direction, a support wheel 33 which is disposed to be substantially symmetrical to the drive wheel 32, partially protruded from a bottom surface of the housing 2, and rotatable to move in the anteroposterior direction (see FIG. 2B).

As shown in FIG. 2B, a leg 2a is formed in a substantial center in a rear side of bottom surface of the housing 2 so as to contact with an installation surface of the video projector 1, directly. The video projector 1 is used with the three portions, that is, the drive wheel 32, the support wheel 33, and the leg 2a being in contact with the installation surface. A rubber or the like is attached to the respective surfaces which are in direct contact with the installation surface in the drive wheel 32 and the support wheel 33, and consequently, large frictional forces occur between the drive wheel 32 and the installation surface of the video projector 1 and between the support wheel 33 and the installation surface of the video projector 1. Thus, when the video projector 1 is moved in an anteroposterior direction as described below, the drive wheel 32 and the support wheel 33 are rolled on the installation surface.

Figure 4:
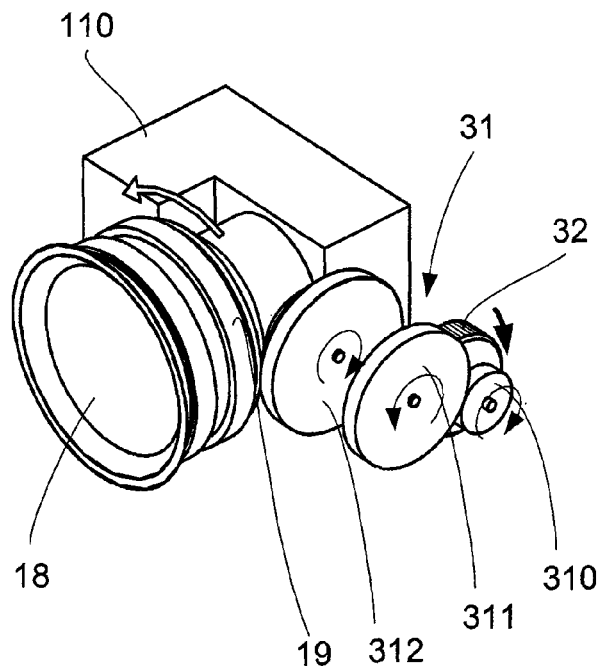
FIG. 4 is a perspective view showing a power transmission mechanism of the video projector.
Figure 5A:
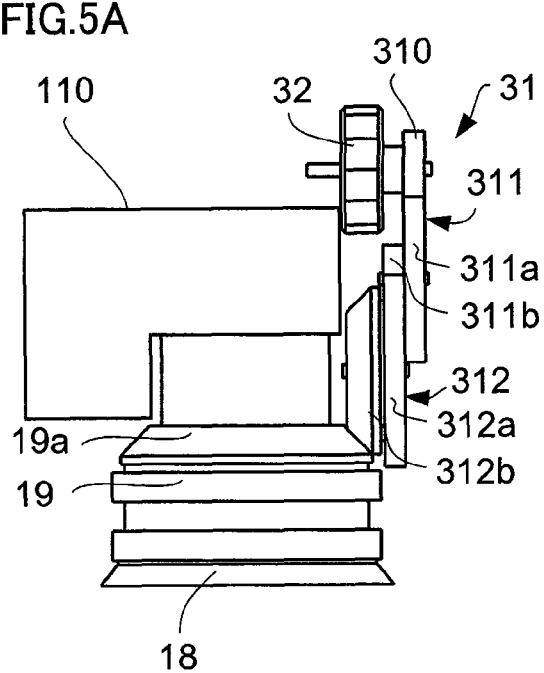
FIG. 5A is a top view showing the power transmission mechanism shown in FIG. 4.
Figure 5B:
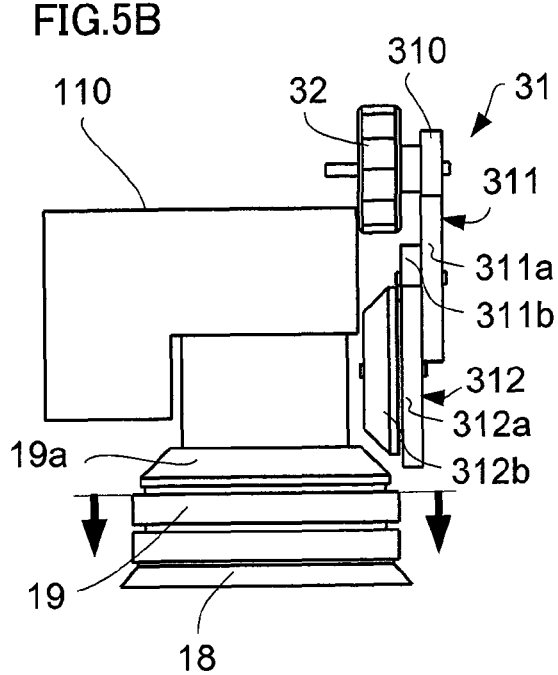
FIG. 5B is a top view for explaining that a power transmission pathway between a drive wheel and a zoom adjustment mechanism is cut off in FIG. 5A.

The configuration of the drive mechanism 30 is further described with reference to FIG. 4 and FIGS. 5A and 5B. As shown in FIG. 4, the power transmission mechanism 31 has three gears 310, 311, and 312 disposed in parallel with each other on a side surface of the video projector 1. The gear 310 is a spur gear and is rotated with the drive wheel 32. The gear 311 has a spur gear 311a which engages with a tooth surface of the gear 310 and a spur gear 311b whose number of teeth is different from that of the spur gear 311a. The gear 312 has a spur gear 312a which engages with the spur gear 311b and a bevel gear 312b which is formed on a side of the projection lens 18. In the power transmission mechanism 31, when the drive wheel 32 turns, the gears 311 and 312 are rotated in conjunction with the gear 310 as shown by arrows in FIG. 4. In other words, the power transmission mechanism 31 is configured so that the gear 312 is rotated in conjunction with the rotation of the drive wheel 32 at a certain reduction ratio as described below.

In the present preferred embodiment, a bevel gear 19a is formed backward in the zoom ring 19. As shown in FIG. 5A, the bevel gear 19a engages with the bevel gear 312b of the gear 312. In other words, in the video projector 1, the zoom ring 19 is turned in conjunction with the rotation of the drive wheel 32. As shown in FIG. 4, for example, when the drive wheel 32 is rotated in a direction shown by arrow, the zoom ring 19 is turned through the power transmission mechanism 31 in a direction shown by outline arrow. An described above, the focal length of the projection lens 18 is varied corresponding to the turning angle of the zoom ring 19, so that the size of the image which is projected on the screen through the projection lens 18 can be varied consequently, by turning the zoom ring 19 in conjunction with the rotation of the drive wheel 32 according to the forward and backward movement of the video projector 1.

The zoom ring 19 can be slid in an anteroposterior direction of the projection lens 18, that is, a direction of a rotation axis thereof. As described above, in a state that the zoom ring 19 is turned in conjunction with the rotation of the drive wheel 32, the zoom ring 19 is located posterior to the projection lens 18 as shown in FIG. 5A. When zoom ring 19 is slid from the state described above to move forward by the user as shown by arrows in FIG. 5B, the bevel gear 19a moves anterior to the projection lens 18 with the zoom ring 19, and consequently, the bevel gear 312b of the power transmission mechanism 31 and the bevel gear 19a of the zoom ring 19 are disengaged from each other. In other words, the zoom ring 19 can serve as a switching mechanism to switch whether the zoom ring 19 is turned in conjunction with the rotation of the drive wheel 32 or the zoom ring 19 can be turned independently from the drive wheel 32 by changing the position of the zoom ring 19 in a power transmission pathway between the drive wheel 32 and the zoom ring 19. In this manner, it is switchable whether the zoom ring 19 can be turned in conjunction with the rotation of the drive wheel 32 or can be turned independently from the rotation of the drive wheel 32 with using the zoom ring 19. Moreover, in case of setting an initial magnification ratio of the projection lens 18 or the like, including a first installation of the video projector 1, for example, the zoom ring 19 can be directly operated with no conjunction with the drive wheel 32.

Figure 6A:
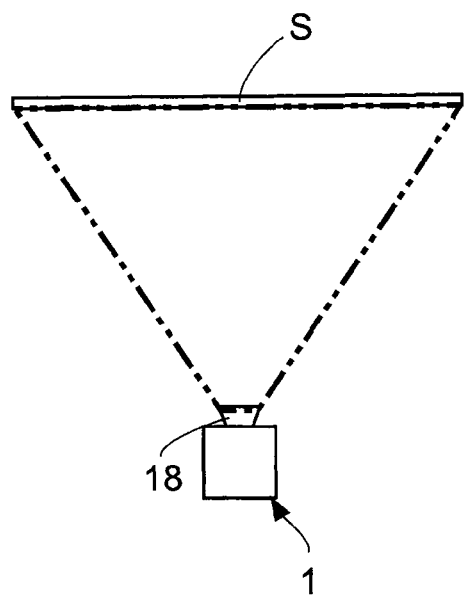
FIG. 6A is a top view for explaining that the video projector projects an image on a screen.
Figure 6B:
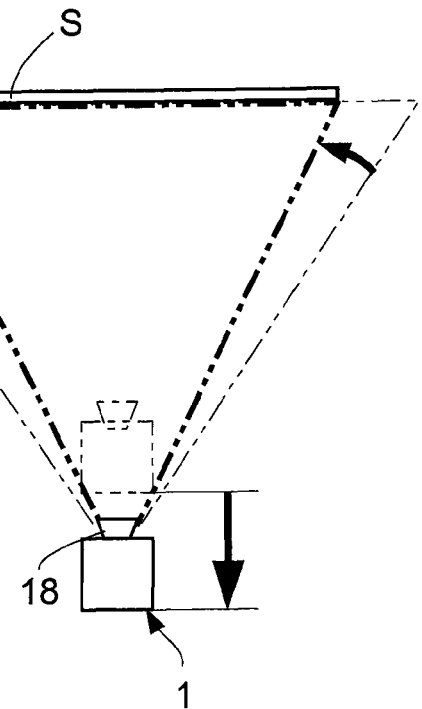
FIG. 6B is a top view for explaining that the video projector is moved backward and variation of light flux projected through a projection lens of the video projector.

Subsequently, the operation when the video projector 1 is used is described with reference to FIGS. 6A and 6B. Two-dotted chain lines in FIGS. 6A and 6B show a range of the light flux projected through the projection lens 18 in the video projector 1. It is assumed that the video projector 1 is used with the magnification ratio of the projection lens 18 set to adjust an image which is projected on a screen S to have a size substantially the same as that of the screen S, as shown in FIG. 6. When moving the video projector 1 backward with the movement of the zoom ring 19 turned in conjunction with the rotation of the drive wheel 32 as shown in FIG. 6B, the drive wheel 32 is rotated on the installation surface of the video projector 1, and the zoom ring 19 is turned in conjunction with the rotation of the drive wheel 32. When the zoom ring 19 is turned, the alignment of the lens elements that constitute the projection lens 18 is changed, so that the magnification ratio of the projection lens 18 is varied. The variation of the magnification ratio makes the light flux projected through the projection lens 18 have a narrower angle in comparison with an angle of the light flux before the movement of the video projector 1.

In a preferred example shown in FIGS. 6A and 6B, when the magnification ratio of the projection lens 18 is varied with the movement of the video projector 1, the size of the image projected on the screen S changes little. In other words, in the video projector 1, the reduction ratio of the gears in the power transmission pathway between the drive wheel 32 and the zoom ring 19 is set to keep the size of the image formed on the screen S before the movement of the video projector 1 same as the size after the movement, in consideration of a rotational amount of the drive wheel 32 and the variation of the magnification ratio when turning the zoom ring 19. When the video projector 1 is moved forward, the zoom ring 19 is turned in conjunction with the rotation of the drive wheel 32, and the light flux projected through the projection lens 18 has a wider angle in comparison with the angle of the light flux before the movement. Also in this case, in the same manner as the above description, the size of the image projected on the screen S varies little.

In the preferred example described above, the size of the image projected on the screen S before the movement of the video projector 1 is substantially the same as the size after the movement. Thus, even when moving the video projector 1 forward and backward to the screen S during use of the video projector 1, for example, the zoom ring 19 does not need to be turned to vary the size of the image on the screen S and to keep the original size. Consequently, the video projector 1 becomes convenient and the projected image may not be interrupted by a hand of an operator, or the like. Moreover, the simple configuration with the gears enables to turn the zoom ring 19 in conjunction with the rotation of the drive wheel 32, so that the video projector 1 can be manufactured at low cost.

Figure 7A:
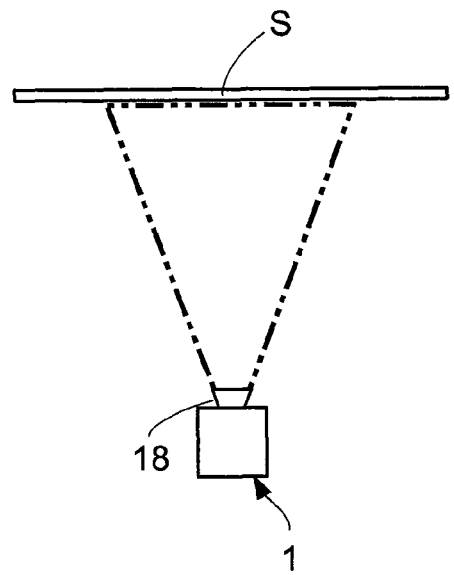
FIG. 7A is a top view for explaining that a video projector according to a modification example of the preferred embodiment projects an image on a screen.
Figure 7B:
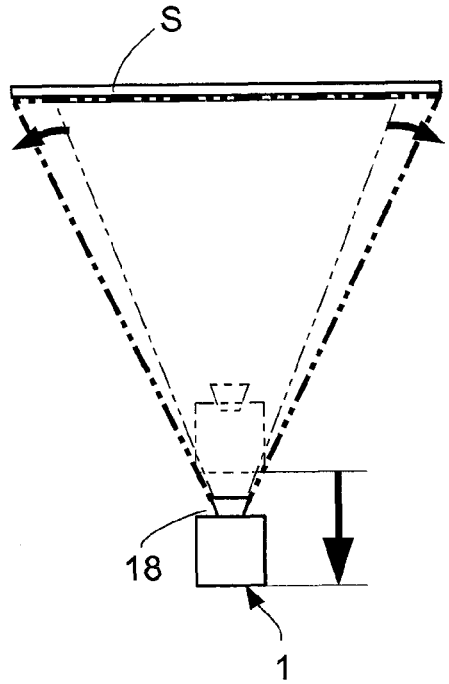
FIG. 7B is a top view for explaining that the video projector is moved backward and variation of light flux projected through a projection lens of the video projector.

The present invention is not limited to the configuration of the preferred embodiment described above, however, various modification are applicable without departing from the scope of the present invention. For example, the relationship of the variation of the magnification ratio of the projection lens 18 to the rotational amount of the drive wheel 32 is not limited to the above description. That is to say, as shown in FIGS. 7A and 7B, when the video projector 1 is moved backward, the magnification ratio of the projection lens 18 can be enlarged by turning the zoom ring 19. Even in such a case, the magnification ratio of the projection lens 18 can be varied by changing the position of the video projector 1 in the anteroposterior direction instead of operating the zoom ring 19 directly, for example, so that the projected image may not be interrupted when operating the zoom ring 19, thus the video projector 1 becomes convenient.

Figure 8A:
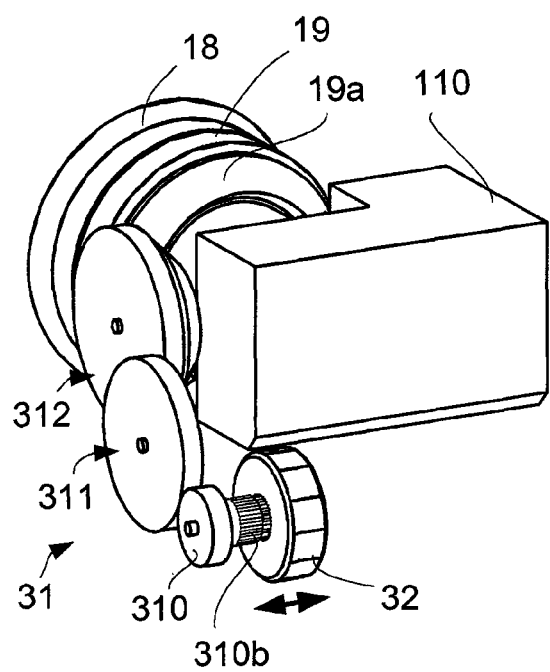
FIG. 8A is a perspective view for explaining that a power transmission pathway between a drive wheel and a zoom adjustment mechanism is cut off in a video projector according to another modification example of the preferred embodiment.
Figure 8B:
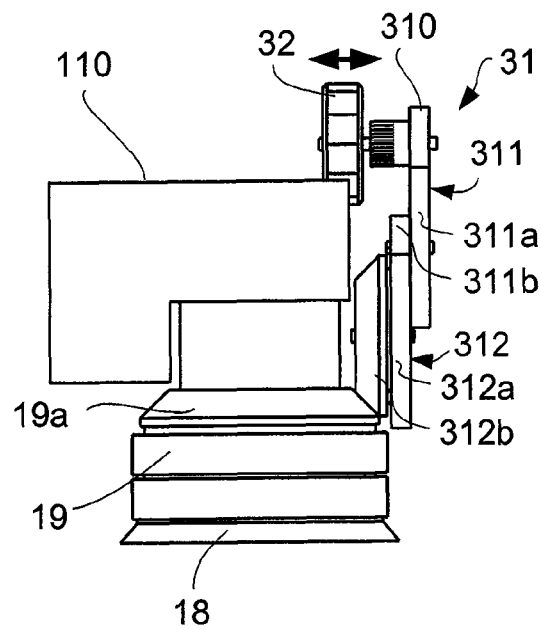
FIG. 8B is a top view of the power transmission pathway shown in FIG. 8A.

Moreover, the switching mechanism to switch whether the zoom ring 19 is turned in conjunction with the rotation of the drive wheel 32 or independently from the rotation of the drive wheel 32 is not limited to the sliding motion of the zoom ring 19 in the anteroposterior direction described above. For example, as shown in FIGS. 8A and 8B, the drive wheel 32 can serve as the switching mechanism, in contrast to the preferred embodiment described above. In this case, it is switchable whether to make the drive wheel 32 and the power transmission mechanism 31 be in conjunction with each other or independently from each other by engaging or disengaging the drive wheel 32, which can slide in a rotation axis of the drive wheel 32 (in a direction of an arrow in FIGS. 8A and 8B), with or from a spline 310b. Consequently, it is switchable whether to vary the magnification ratio of the projection lens 18 in conjunction with the movement of the video projector 1 in the anteroposterior direction or change the magnification ratio of the projection lens 18 by turning directly the zoom ring 19 depending on a situation, thus the video projector 1 gets more convenient. It is also switchable whether to cut off the power transmission pathway between the drive wheel 32 and the zoom ring 19 or not by changing the position of one of the gears 310, 311, and 312 included in the power transmission mechanism 31, for example, as the switching mechanism.

Moreover, the image processor 100 is not limited to the configuration that forms the image with using the color wheel 13 and the DMD 17. It, however, may be configured that the image is formed by passing the lights which are outputted from the light source through liquid crystal display panels, which are arranged corresponding to three primary colors, and synthesizing the lights passing through the liquid crystal display panels subsequently. Moreover, the power transmission mechanism can also have a timing belt and a gear such as a pulley or the like. Furthermore, the drive wheel may be in conjunction with a focus adjustment ring, which changes a focus position of the light flux projected through the projection lens, by changing the alignment of the lens elements of the projection lens, for example, through the power transmission mechanism, not only the size of the image projected on the screen but also the focus position of the image can be varied by rotating the drive wheel with the movement of the video projector.

In summary, the video projector in accordance with the present invention is configured that the drive wheel is partially protruded from the bottom surface of the housing, and the drive wheel and the zoom adjustment mechanism, which varies the alignment of the lens elements of the projection lens, are in conjunction with each other through the power transmission mechanism. Consequently, when rotating the drive wheel by moving the video projector, the zoom adjustment mechanism changes the alignment of the lens elements of the projection lens in conjunction with the rotation of the drive wheel, so that the size of the image projected on the screen can easily be varied without the direct operation of the image adjustment mechanism by the user, and thus the video projector becomes inexpensive and convenient.

This application is based on Japanese patent application 2006-144415 filed May 24, 2006 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A video projector comprising:
   a light source;
   an image forming unit that generates an image with using image data;
   a projection lens to project the image formed by the image forming unit to a screen disposed in front of the video projector;
   a zoom ring which varies a magnification ratio of the projection lens;
   a drive wheel which is partially protruded from a bottom face of a housing; and
   a power transmission mechanism provided between the drive wheel and the zoom ring, so that the zoom ring is turned in conjunction with the rotation of the drive wheel when the video projector is moved forward or backward in an anteroposterior direction.

2. The video projector in accordance with claim 1, wherein the projection lens includes a zoom adjustment mechanism that varies an alignment of lens elements constituting the projection lens; and
   the zoom ring is in conjunction with the zoom adjustment mechanism.

3. The video projector in accordance with claim 1, further comprising:
   a switching mechanism to switch whether the zoom ring is turned in conjunction with the rotation of the drive wheel or the zoom ring can be rotated independently from the drive wheel.

4. The video projector in accordance with claim 3, wherein the zoom ring is slidable in an anteroposterior direction of the projection lens so as to serve as the switching mechanism; and
   when the zoom ring is located posterior to the projection lens, the zoom ring is disengaged with the power transmission mechanism, so that the zoom ring is not turned in conjunction with the rotation of the drive wheel even when the video projector is moved in the anteroposterior direction.

5. The video projector in accordance with claim 3, wherein the drive wheel is slidable in a rotation axis thereof so as to serve as the switching mechanism; and
   when the drive wheel is located rightward or leftward to the power transmission mechanism, the drive wheel is disengaged with the power transmission mechanism, so that the zoom ring is not turned in conjunction with the rotation of the drive wheel even when the video projector is moved in the anteroposterior direction.

6. The video projector in accordance with claim 1, wherein the power transmission mechanism includes a plurality of gears; and
   a reduction ratio of the gears is set to keep the size of the image formed on the screen before the movement of the video projector same as the size after the movement, in consideration of a rotational amount of the drive wheel and the variation of the magnification ratio of the projection lens when turning the zoom ring.

* * * * *